United States Patent
Cho et al.

(10) Patent No.: US 7,542,656 B2
(45) Date of Patent: Jun. 2, 2009

(54) METHOD AND APPARATUS OF RECORDING A MULTI-CHANNEL STREAM, AND A RECORDING MEDIUM CONTAINING A MULTI-CHANNEL STREAM RECORDED BY SAID METHOD

(75) Inventors: Jang Hui Cho, Seoul (KR); Jea Yong Yoo, Seoul (KR); Kang Soo Seo, Kyunggi-do (KR); Byung Jin Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 163 days.

(21) Appl. No.: 10/176,369

(22) Filed: Jun. 20, 2002

(65) Prior Publication Data

US 2002/0196365 A1 Dec. 26, 2002

(30) Foreign Application Priority Data

Jun. 21, 2001 (KR) ............................ 2001-0035398

(51) Int. Cl.
   *H04N 5/91* (2006.01)
(52) U.S. Cl. .............................. 386/83; 386/45; 386/46; 386/95; 386/96; 386/125; 386/126
(58) Field of Classification Search .................. 386/83, 386/95–97, 69–70, 124–126, 98, 46; 711/151, 711/112
   See application file for complete search history.

(56) References Cited

U.S. PATENT DOCUMENTS 5,521,898 A 5/1996 Ogasawara
5,559,808 A 9/1996 Kostreski et al.
5,602,956 A 2/1997 Suzuki et al.
5,651,010 A 7/1997 Kostreski et al.
5,729,549 A 3/1998 Kostreski et al.

(Continued)

FOREIGN PATENT DOCUMENTS

CN 1134583 10/1996

(Continued)

OTHER PUBLICATIONS

Chinese Office Action dated Dec. 14, 2007.

(Continued)

*Primary Examiner*—Thai Tran
*Assistant Examiner*—Jamie J Atala
(74) *Attorney, Agent, or Firm*—Harness, Dickey & Pierce, P.L.C.

(57) ABSTRACT

The present invention relates to method and apparatus of recording a multi-channel data stream on a recording medium in such a manner that substreams of digital channels constituting the multi-channel data stream can be distinguished each other in reproduction. The present recording method records a multi-channel stream composed of substreams belonging to plural selected channels on a recording medium, unitizes the recorded stream to a single stream object, creates a piece of search information for each substream contained in the recorded multi-channel stream, and records the created plural pieces of search information on the recording medium. The present method makes it possible to selectively search and reproduce each substream among a multi-channel stream recorded on a recording medium, thereby improving use convenience of a recording machine such as a digital video recorder.

20 Claims, 11 Drawing Sheets

U.S. PATENT DOCUMENTS

| | | | |
|---|---|---|---|
| 5,732,185 | A | 3/1998 | Hirayama et al. |
| 5,742,569 | A | 4/1998 | Yamamoto et al. |
| 5,747,136 | A | 5/1998 | Shono et al. |
| 5,771,334 | A | 6/1998 | Yamauchi et al. |
| 5,784,528 | A | 7/1998 | Yamane et al. |
| 5,819,003 | A | 10/1998 | Hirayama et al. |
| 5,835,493 | A | 11/1998 | Magee et al. |
| 5,854,873 | A | 12/1998 | Mori et al. |
| 5,870,523 | A | 2/1999 | Kikuchi et al. |
| 5,877,817 | A | 3/1999 | Moon |
| 5,884,004 | A | 3/1999 | Sato et al. |
| 5,909,257 | A | 6/1999 | Ohishi et al. |
| 5,913,010 | A | 6/1999 | Kaneshige et al. |
| 5,940,255 | A | 8/1999 | Uwabo et al. |
| 5,949,792 | A | 9/1999 | Yasuda et al. |
| 5,953,187 | A | 9/1999 | Uwabo et al. |
| 5,987,126 | A | 11/1999 | Okuyama et al. |
| 5,999,698 | A | 12/1999 | Nakai et al. |
| 6,031,962 | A | 2/2000 | Sawabe et al. |
| 6,035,095 | A | 3/2000 | Kaneshige et al. |
| 6,064,796 | A | 5/2000 | Nakamura et al. |
| 6,067,400 | A | 5/2000 | Saeki et al. |
| 6,167,189 | A | 12/2000 | Taira et al. |
| 6,181,870 | B1 | 1/2001 | Okada et al. |
| 6,181,872 | B1 | 1/2001 | Yamane et al. |
| 6,195,726 | B1 | 2/2001 | Hogan |
| 6,219,488 | B1 | 4/2001 | Mori et al. |
| 6,222,805 | B1 | 4/2001 | Mori et al. |
| 6,285,825 | B1 | 9/2001 | Miwa et al. |
| 6,321,027 | B2 | 11/2001 | Honjo |
| 6,336,002 | B1 | 1/2002 | Yamauchi et al. |
| 6,343,062 | B1 | 1/2002 | Furukawa et al. |
| 6,351,442 | B1 | 2/2002 | Tagawa et al. |
| 6,353,613 | B1 | 3/2002 | Kubota et al. |
| 6,360,055 | B1 | 3/2002 | Kaneshige et al. |
| 6,377,747 | B1 | 4/2002 | Murase et al. |
| 6,385,388 | B1 | 5/2002 | Lewis et al. |
| 6,385,389 | B1 | 5/2002 | Maruyama et al. |
| 6,385,394 | B1 | 5/2002 | Okada et al. |
| 6,385,398 | B1 | 5/2002 | Matsumoto |
| 6,393,574 | B1 | 5/2002 | Kashiwagi et al. |
| 6,415,101 | B1 | 7/2002 | DeCarmo et al. |
| 6,424,797 | B1 * | 7/2002 | Murase et al. ............ 386/125 |
| 6,445,872 | B1 | 9/2002 | Sano et al. |
| 6,470,140 | B1 | 10/2002 | Sugimoto et al. |
| 6,470,460 | B1 | 10/2002 | Kashiwagi et al. |
| 6,504,996 | B1 | 1/2003 | Na et al. |
| 6,515,101 | B1 | 2/2003 | Sheares |
| 6,546,195 | B2 | 4/2003 | Kashiwagi et al. |
| 6,556,774 | B2 | 4/2003 | Tsumagari et al. |
| 6,564,006 | B1 * | 5/2003 | Mori et al. ............ 386/95 |
| 6,567,608 | B2 * | 5/2003 | Mori et al. ............ 386/96 |
| 6,573,819 | B1 | 6/2003 | Oshima et al. |
| 6,584,277 | B2 | 6/2003 | Tsumagari et al. |
| 6,603,517 | B1 | 8/2003 | Shen et al. |
| 6,618,396 | B1 | 9/2003 | Kondo et al. |
| 6,654,543 | B2 * | 11/2003 | Ando et al. ............ 386/95 |
| 6,788,883 | B1 | 9/2004 | Park et al. |
| 6,801,713 | B1 | 10/2004 | Yagawa et al. |
| 6,901,078 | B2 | 5/2005 | Morris |
| 6,904,227 | B1 | 6/2005 | Yamamoto et al. |
| 7,024,102 | B1 | 4/2006 | Inoshita et al. |
| 7,072,573 | B2 | 7/2006 | Okada et al. |
| 7,106,946 | B1 | 9/2006 | Kato |
| 7,124,303 | B2 | 10/2006 | Candelore et al. |
| 7,236,687 | B2 | 6/2007 | Kato et al. |
| 2001/0033517 | A1 | 10/2001 | Ando et al. |
| 2001/0038745 | A1 | 11/2001 | Sugimoto et al. |
| 2001/0043790 | A1 | 11/2001 | Saeki et al. |
| 2001/0053280 | A1 | 12/2001 | Yamauchi et al. |
| 2002/0015383 | A1 | 2/2002 | Ueno |
| 2002/0015581 | A1 * | 2/2002 | Ando et al. ............ 386/95 |
| 2002/0021761 | A1 | 2/2002 | Zhang et al. |
| 2002/0031336 | A1 | 3/2002 | Okada et al. |
| 2002/0046328 | A1 * | 4/2002 | Okada ............ 711/151 |
| 2002/0076201 | A1 | 6/2002 | Tsumagari et al. |
| 2002/0097981 | A1 | 7/2002 | Seo et al. |
| 2002/0097984 | A1 | 7/2002 | Abecassis |
| 2002/0106196 | A1 | 8/2002 | Yamauchi et al. |
| 2002/0127002 | A1 | 9/2002 | Mori et al. |
| 2002/0145702 | A1 | 10/2002 | Kato et al. |
| 2002/0159368 | A1 | 10/2002 | Noda et al. |
| 2002/0180803 | A1 | 12/2002 | Kaplan et al. |
| 2002/0196365 | A1 | 12/2002 | Cho et al. |
| 2002/0197059 | A1 | 12/2002 | Cho et al. |
| 2003/0002194 | A1 | 1/2003 | Andoh |
| 2003/0026597 | A1 | 2/2003 | Cho et al. |
| 2003/0118327 | A1 | 6/2003 | Um et al. |
| 2003/0123849 | A1 | 7/2003 | Nallur et al. |
| 2003/0133509 | A1 | 7/2003 | Yanagihara et al. |
| 2003/0161615 | A1 | 8/2003 | Tsumagari et al. |
| 2003/0221055 | A1 | 11/2003 | Okada |
| 2003/0235403 | A1 | 12/2003 | Seo et al. |
| 2003/0235404 | A1 | 12/2003 | Seo et al. |
| 2004/0086261 | A1 | 5/2004 | Hanes |
| 2004/0156621 | A1 | 8/2004 | Seo et al. |
| 2004/0179819 | A1 | 9/2004 | Cho et al. |
| 2004/0179820 | A1 | 9/2004 | Kashiwagi et al. |
| 2004/0179827 | A1 | 9/2004 | Cho et al. |
| 2004/0247290 | A1 | 12/2004 | Seo et al. |
| 2004/0252975 | A1 | 12/2004 | Cho et al. |
| 2005/0025459 | A1 | 2/2005 | Kato et al. |
| 2005/0036763 | A1 | 2/2005 | Kato et al. |
| 2005/0232111 | A1 | 10/2005 | Sawabe et al. |
| 2006/0222340 | A1 | 10/2006 | Yamauchi et al. |

FOREIGN PATENT DOCUMENTS

| | | |
|---|---|---|
| CN | 1197573 | 10/1998 |
| CN | 1220458 | 6/1999 |
| CN | 1237852 | 12/1999 |
| CN | 1251461 | 4/2000 |
| CN | 1272209 | 11/2000 |
| CN | 1136546 | 1/2004 |
| EP | 0723216 | 9/1996 |
| EP | 0737980 | 4/1997 |
| EP | 0847198 | 3/1998 |
| EP | 0836189 | 4/1998 |
| EP | 0836183 | 8/1998 |
| EP | 0896337 | 2/1999 |
| EP | 0917355 | 5/1999 |
| EP | 0918438 | 6/1999 |
| EP | 0920203 | 6/1999 |
| EP | 0873022 | 10/1999 |
| EP | 1 003 338 | 5/2000 |
| EP | 1 043 724 | 10/2000 |
| EP | 0940983 | 10/2000 |
| EP | 1126454 | 8/2001 |
| EP | 1198132 | 4/2002 |
| EP | 1198133 | 4/2002 |
| EP | 1202568 | 7/2002 |
| EP | 1081885 | 3/2005 |
| JP | 64-003781 | 1/1989 |
| JP | 01-116819 | 5/1989 |
| JP | 08-088832 | 4/1996 |
| JP | 08-235833 | 9/1996 |
| JP | 09-023403 | 1/1997 |
| JP | 09-251759 | 9/1997 |
| JP | 10-032780 | 2/1998 |
| JP | 10-040667 | 2/1998 |
| JP | 10-051737 | 2/1998 |
| JP | 10-269698 | 10/1998 |
| JP | 10-271449 | 10/1998 |
| JP | 10-299698 | 11/1998 |

| | | |
|---|---|---|
| JP | 11-041563 | 2/1999 |
| JP | 11-066813 | 3/1999 |
| JP | 11-103444 | 4/1999 |
| JP | 11-134812 | 5/1999 |
| JP | 11-185463 | 7/1999 |
| JP | 11/259976 | 9/1999 |
| JP | 11-2559976 | 9/1999 |
| JP | 11-346341 | 12/1999 |
| JP | 2000-030414 | 1/2000 |
| JP | 2000-041066 | 2/2000 |
| JP | 2000-069437 | 3/2000 |
| JP | 2000-113602 | 4/2000 |
| JP | 2000-149514 | 5/2000 |
| JP | 2000-235779 | 8/2000 |
| JP | 2000-293938 | 10/2000 |
| JP | 2000-299836 | 10/2000 |
| JP | 2000-348442 | 12/2000 |
| JP | 2001-024973 | 1/2001 |
| JP | 2001-024985 | 1/2001 |
| JP | 2001-111944 | 1/2001 |
| JP | 2001-067802 | 3/2001 |
| JP | 2001-111929 | 4/2001 |
| JP | 2001-111960 | 4/2001 |
| JP | 2001-169246 | 6/2001 |
| JP | 2001-297535 | 10/2001 |
| JP | 2002-083486 | 3/2002 |
| JP | 2002-112179 | 4/2002 |
| JP | 2002-150685 | 5/2002 |
| JP | 2002-158972 | 5/2002 |
| JP | 2002-158974 | 5/2002 |
| JP | 2002-176623 | 6/2002 |
| JP | 2002-216460 | 8/2002 |
| JP | 2002-222581 | 8/2002 |
| JP | 2003-087744 | 3/2003 |
| JP | 2003-116100 | 4/2003 |
| JP | 2006-503400 | 1/2006 |
| KR | 10-2000-0031861 | 6/2000 |
| KR | 10-2000-0055028 | 9/2000 |
| KR | 10-2000-0056179 | 9/2000 |
| KR | 10-2000-0065876 | 11/2000 |
| KR | 10-2001-0022702 | 3/2001 |
| KR | 10-0294884 | 4/2001 |
| KR | 1999-22858 | 5/2001 |
| KR | 10-2001-0098007 | 11/2001 |
| KR | 10-2001-0098101 | 11/2001 |
| KR | 10-2001-0107578 | 12/2001 |
| KR | 10-2002-0006674 | 1/2002 |
| KR | 10-2002-0020919 | 3/2002 |
| KR | 10-2002-0097454 | 12/2002 |
| KR | 10-2002-0097455 | 12/2002 |
| KR | 1020020097455 A | 12/2002 |
| KR | 10-2004-0000290 | 1/2004 |
| KR | 10-2004-0030992 | 4/2004 |
| KR | 10-2004-0030994 | 4/2004 |
| KR | 10-2004-0030995 | 4/2004 |
| KR | 10-2004-0041581 | 5/2004 |
| TW | 391548 | 5/2000 |
| WO | WO 97/06531 | 2/1997 |
| WO | WO 97/13364 | 4/1997 |
| WO | WO 97/13365 | 4/1997 |
| WO | WO 97/13366 | 4/1997 |
| WO | WO 98/00952 | 1/1998 |
| WO | WO 99/08281 | 2/1999 |
| WO | WO 99/34601 | 7/1999 |
| WO | WO 00/02195 | 1/2000 |
| WO | WO 00/05883 | 2/2000 |
| WO | WO 00/42515 | 7/2000 |
| WO | WO 00/62295 | 10/2000 |
| WO | WO 01/80239 | 10/2001 |
| WO | WO 01/82604 | 11/2001 |
| WO | WO 01/82606 | 11/2001 |
| WO | WO 01/82609 | 11/2001 |
| WO | WO 01/82610 | 11/2001 |
| WO | WO 2004/001750 | 11/2001 |
| WO | WO 00/42515 * | 7/2002 |
| WO | WO 2004/001748 | 12/2003 |
| WO | WO 2004/001753 | 12/2003 |
| WO | WO 2004/045206 | 5/2004 |
| WO | WO 2004/075183 | 9/2004 |
| WO | WO 2004/077417 | 9/2004 |
| WO | WO 2004/079736 | 9/2004 |
| WO | WO 2004/081939 | 9/2004 |
| WO | WO 2004/086371 | 10/2004 |

OTHER PUBLICATIONS

Japanese Office Action dated Jan. 22, 2008.
European Search Report dated Dec. 28, 2007.
European Search Report dated Jan. 2, 2008.
United States Office Action dated Jan. 2, 2008.
United States Office Action dated Jan. 28, 2008.
Search Report for corresponding European Application No. 03761863.4 dated Mar. 25, 2008.
Office Action for corresponding Japanese Application No. 2004-517368 dated May 7, 2008.
Office Action for corresponding Japanese Application No. 2004-517390 dated May 7, 2008.
Office Action for corresponding Japanese Application No. 2004-553264 dated May 20, 2008.
European Search Report dated Aug. 13, 2008.

* cited by examiner

FIG. 4

*PGC Information # i ( PGCI # i)*

| PGC General Information (PGC_GI) |
|---|
| Program Information # 1 (PGI #1) |
| ⋮ |
| Program Information # k (PGI #k) |
| ⋮ |
| Program Information # n (PGI #n) |
| Cell Information Search Pointer #1 (CI_SRP #1) |
| ⋮ |
| Cell Information Search Pointer #n (CI_SRP #m) |
| Cell Information #1 (CI #1) |
| ⋮ |
| Cell Information #k (CI #k) |
| ⋮ |
| Cell Information #m (CI #m) |

| Reserved |
|---|
| PG_TY ( Program Type ) |
| C_Ns ( Number of Cells in this PG ) |
| PRM_TXTI ( Primary Text Information ) |
| REP_PI ( Representative Picture Information ) |
| THM_SRPN ( Thumbnail Search Pointer Number ) |
| IT_TXT_SRPN ( IT_TXT Search Pointer Number for this Play List ) |

| C_TY ( Cell Type ) |
|---|
| HOBI_SRPN ( HOBI Search Pointer Number ) |
| PTMAPN ( PTMAP Number ) |
| C_V_S_PTM ( start PTM of this Cell ) |
| C_V_E_PTM ( End PTM of this Cell ) |

FIG. 5

*Program Type*

| b7 | b6 | b5 | b4 | b3 | b2 | b1 | b0 |
|----|----|----|----|----|----|----|----|
| Protect | S/M | Reserved | | | Channel_Ns | | |

Protect ----------- 0b : This PG is not in protected state
                     1b : This PG is in protected state S/M ----------- 0b : This PG has single-channel stream
                     1b : This PG has multi-channel stream Channel_Ns --------- Number of broadcast digital channels referred by this PG

FIG. 6

*Cell Type*

| b7 | b6 | b5 | b4 | b3 | b2 | b1 | b0 |
|----|----|----|----|----|----|----|----|
| C_TY1 | | Reserved | | | C_CH_N | | |

C_TY1 ------------ single/multiple channel

C_CH_N ----------- broadcast digital channel number referred by this Cell

METHOD AND APPARATUS OF RECORDING A MULTI-CHANNEL STREAM, AND A RECORDING MEDIUM CONTAINING A MULTI-CHANNEL STREAM RECORDED BY SAID METHOD

CROSS-REFERENCE TO RELATED APPLICATIONS

Pursuant to 35 U.S.C. § 119(a), this application claims the benefit of earlier filing date and right of priority to the Korean Application No. 2001-35398, filed on Jun. 21, 2001, the content of which is hereby incorporated by reference herein in its entirety.

BACKGROUND OF THE INVENTION

1. Field of the Invention

The present invention relates to method and apparatus of recording a multi-channel data stream on a recording medium, e.g., a writable high-density digital versatile disk (abbreviated to 'HD-DVD' hereinafter) in such a manner that substreams of digital channels constituting the multi-channel data stream can be distinguished from each other in reproduction.

The present invention further relates to a recording medium on which a multi-channel data stream is recorded in such a manner that sub streams of digital channels constituting the multi-channel data stream can be distinguished from each other in reproduction.

2. Description of the Related Art

Owing to technical improvement in the fields of video/audio data compression, digital modulation/demodulation, and so on, a digital television broadcast system broadcasting TV signals in the form of digital data streams is being standardized rapidly.

In the digital television broadcast system, audio/video (A/V) signals to be broadcast are compressed according to the data compressing rule specified by MPEG 2 (Moving Picture Experts Group) and the compressed A/V data are broadcasted in the form of a transport stream (TS), which is also defined in MPEG 2 standard, composed of successive 188-byte-long transport packets (TPs).

The digital TV broadcast system, which will be commercialized soon owing to technical improvement of A/V data compression and transmission, is able to support much higher-quality of video and audio than an analog TV system. Furthermore, it ensures data compatibility with a digital communication device, a digital storage device, etc.

In the meantime, a new device is being developed to prepare for commercialization of digital TV broadcast systems. That is a digital recorder being able to receive a TS of digital broadcast programs and to record the TS on a writable HD-DVD. Such a digital recorder will be widely used as digital TV broadcast systems are commercialized.

A single physical broadcast channel (called 'RF channel' in general) has about 6 MHz bandwidth which ensures 19.4 Mbps data rate. This data rate can carry a single HD-TV broadcast signal or about four SD-TV signals. Such a logical or virtual channel carrying one SD-TV signal in an RF channel is called 'digital channel'.

In other words, a single RF channel sometimes includes several digital channels, namely, sub-channels which carry mutually-different broadcast programs.

Therefore, a DVD recorder being developed may have to record two or more digital channels simultaneously at a user's request. However, if a DVD recorder records a plurality of digital channels and creates management information through the same manner as it does for a single digital channel, a DVD could not tell digital channels apart among a recorded stream of digital channels. Namely, a user could not select only one program, i.e., one digital channel to be reproduced from among the plurality of recorded digital channels.

SUMMARY OF THE INVENTION

It is an object of the present invention to provide method and apparatus of recording a multi-channel stream on a recording medium in a manner that substreams in the multi-channel stream can be distinguished each other in reproduction mode by management information and/or by totally or partially area-separate recording.

A method of recording a multi-channel on a recording medium in accordance with the present invention is characterized in that it comprises the steps of: recording a multi-channel stream composed of substreams belonging to a plurality of channels and unitizing the recorded stream to a single stream object; and creating search information for each substream contained in the recorded multi-channel stream unitized to the single stream object and recording the created search information on a recording medium.

An apparatus of recording a multi-channel on a recording medium in accordance with the present invention is characterized in that it comprises: a data receiver receiving at least one RF channel of a digital broadcast signal to output a multi-channel stream composed of substreams belonging to selected plural sub-channels; and a recording means recording the multi-channel stream on a recording medium, unitizing the recorded stream to a single stream object, creating search information for each substream contained in the recorded stream, and recording the created search information on the recording medium.

BRIEF DESCRIPTION OF THE DRAWINGS

The accompanying drawings, which are included to provide a further understanding of the present invention, illustrate the preferred embodiments of the invention, and together with the description, serve to explain the principles of the present invention, and wherein:

FIGS. 4 to 7 are illustrative structures of navigation data created when a multi-channel stream is recorded as shown in FIG. 3;

DETAILED DESCRIPTION OF THE PREFERRED EMBODIMENT

In order that the invention may be fully understood, a preferred embodiment thereof will now be described with reference to the accompanying drawings.

Figure 1:
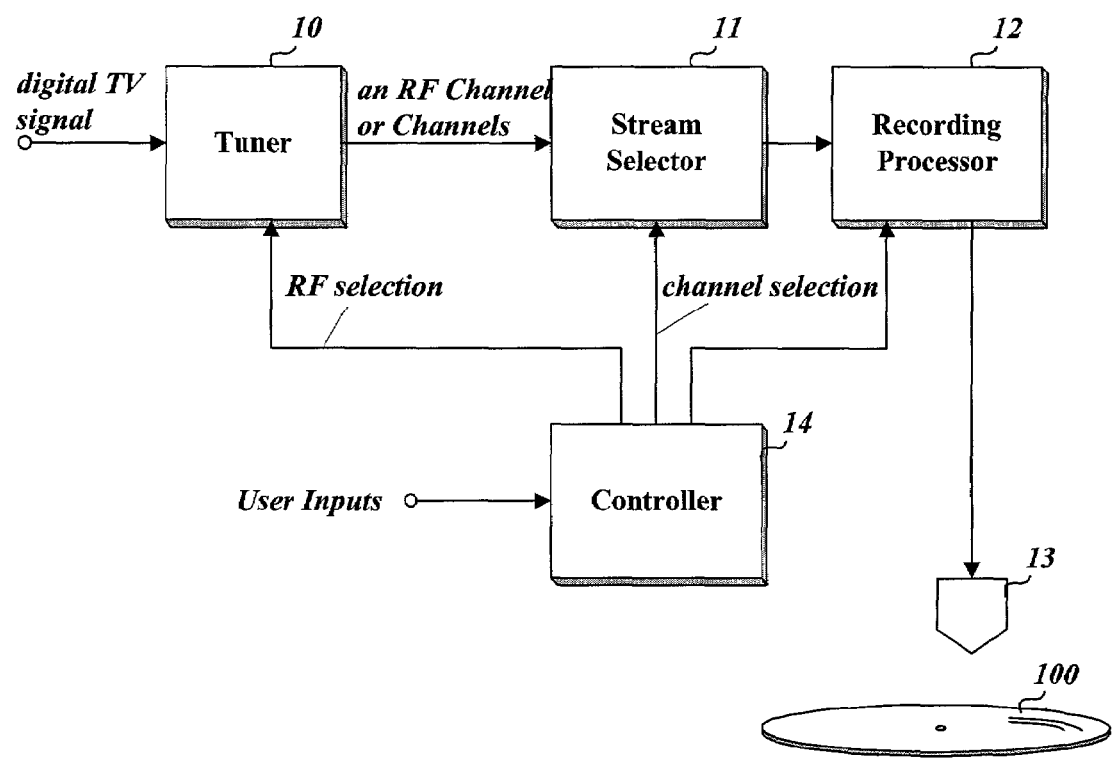
FIG. 1 is a block diagram of an apparatus recording a multi-channel stream in accordance with the present invention.

FIG. 1 is a block diagram of an apparatus recording a multi-channel stream in accordance with the present invention.

The apparatus of FIG. 1 may be a digital video recorder (DVR) being able to record a digital broadcast signal on a recording medium, e.g., a writable HD-DVD. The apparatus comprises a tuner 10 tuning its passband to at least one RE band of digital broadcast TV signal; a stream selector 11 selecting a plurality of substreams belonging to chosen digital channels (or sub-channels) from a data stream of an RE channel or channels passed by the tuner 10; a recording processor 12 recording the selected substreams in a single HOB (High-Density Stream Object) or HOBs according to a preset recording mode, creating and writing navigation data for every recorded substream; an optical pickup 13 forming mark/space patterns on a HD-DVD 100 in accordance with bit patterns of stream and navigation data outputted from the recording processor 12; and a controller 14 conducting overall control operations of all elements for multi-stream record.

Figure 2:
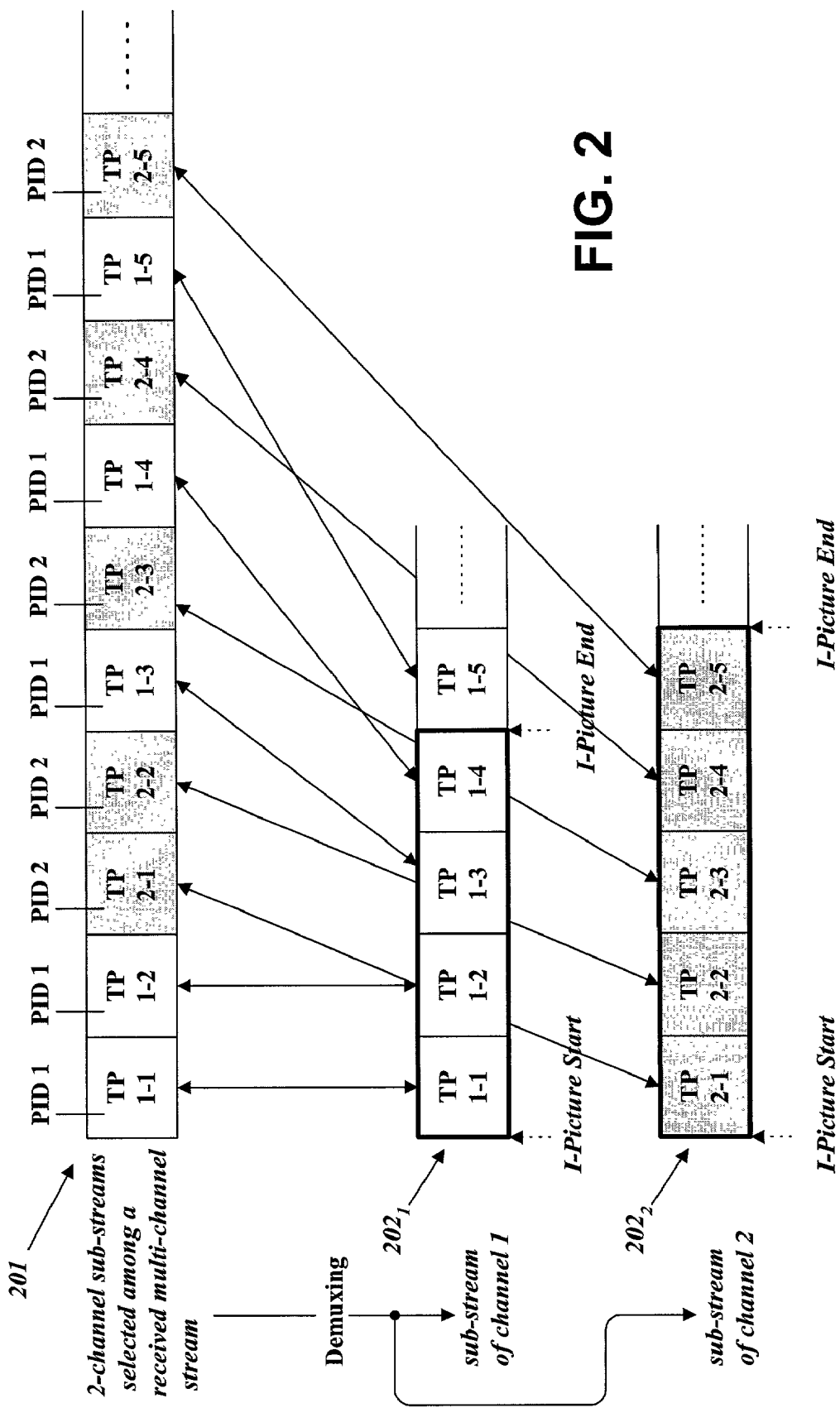
FIG. 2 illustrates a series of transport packets belonging to two sub-channels outputted in the form of single stream or mutually-separated streams.

The tuner 10 passes one digital broadcast TV channel, namely, an RF channel selected by the controller 14. The stream selector 11 extracts transport packets (TPs) belonging to several, e.g., 2 digital channels selected through the controller 14 from a multi-channel stream of the RF channel passed by the tuner 10. The extracted series of TPs by the stream selector 11 is outputted in the form of single stream 201 or mutually-separated streams $202_1$ and $202_2$, as illustrated in FIG. 2.

The tuner 10 can also pass multiple RF channels. In multiple passing mode, the stream selector 11 is also able to extract more than one substream from each RF channel to output a series of TPs belonging to digital channels chosen from available channels offered by respective RF channels.

For the convenience of explanation, it is supposed in all embodiments described in below that the stream selector 11 selects two substreams, namely, two digital channels from a received multi-channel stream.

The recording processor 12 can distinguish between two digital-channel substreams, namely, the first and the second substream, based on packet ID (PID) written in every TP outputted from the stream selector 11.

The first and the second digital-channel substream are recorded according to a preset recording mode. If the preset recording mode is 'mixed', the recording processor 12 records two multiplexed substreams in a single allocated HOB 301 as they are received from the stream selector 12 as shown in FIG. 3.

In the meantime, the recording processor 12 creates navigation data for each digital-channel substream based on the distinguished digital-channel information and each substream recording information. The way in which navigation data is created is described below in detail.

Figure 3:
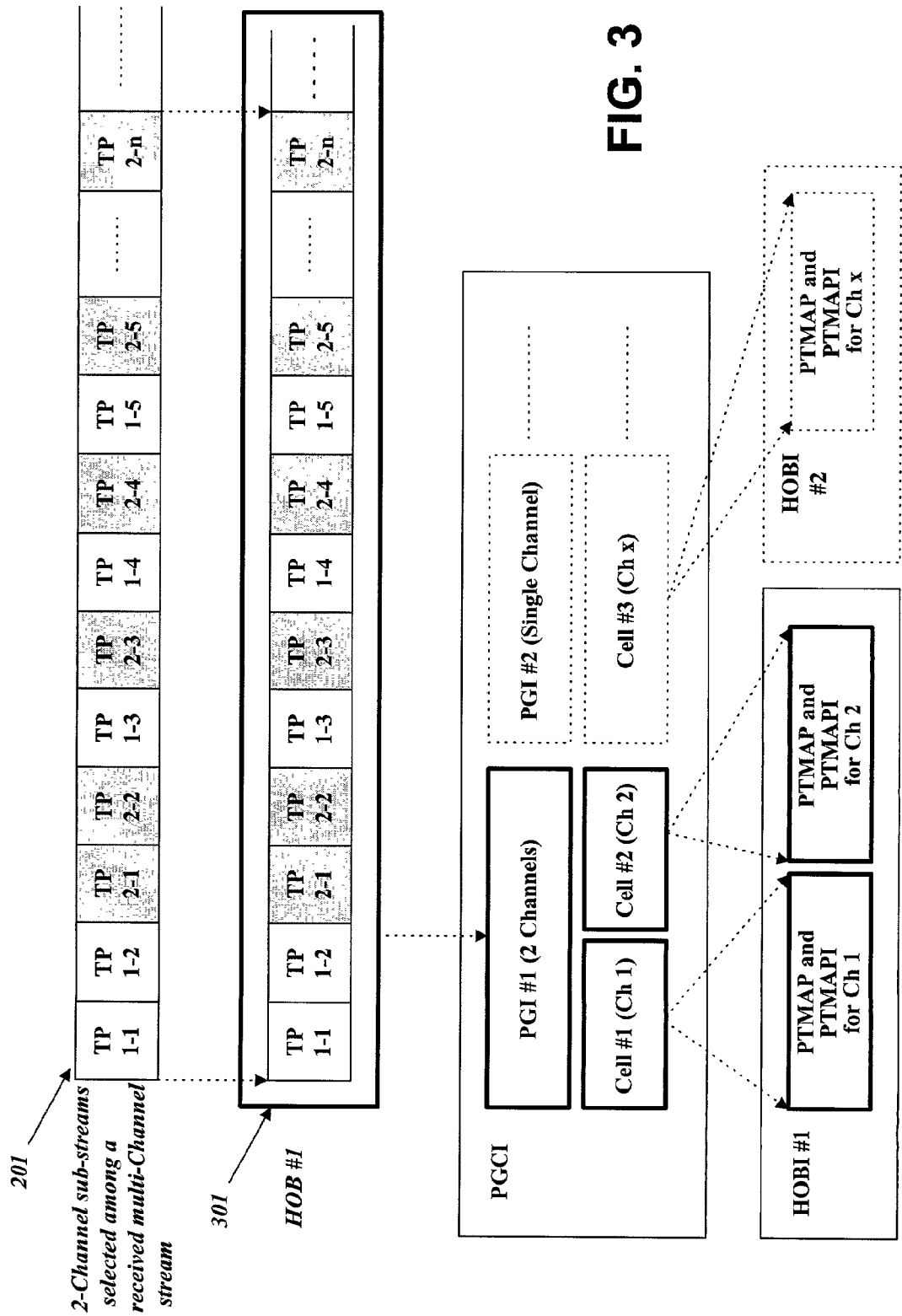
FIG. 3 illustrates the first embodiment of creating navigation data for substreams of a plurality of digital channels recorded in a single high-density stream object unit (abbreviated to 'HOB' hereinafter) in accordance with the present invention.

FIG. 3 illustrates the first embodiment of creating navigation data for substreams of a plurality of digital channels recorded in a single HOB in accordance with the present invention.

A recording medium for recording a digital broadcast signal has a provisional recording standard. According to the provisional recording standard, a recording medium shall have Program Chain Information (PGCI) prepared for index of every recorded program and for reproduction order among them. The PGCI includes Program Information (PGI) and Cell Information (CI) which are respectively created for each single data stream continuously recorded from recording start to stop. Furthermore, a single Presentation Time Map (PT-MAP) shall be created for each single recorded data stream according to the provisional recording standard. The PTMAP, used for stream search, has collection of position data or position-related time length data for every data unit constituting a recorded data stream. Search pointer and information of each PTMAP are included in HOB information (HOBI).

However, for two substreams recorded in a single HOB in accordance with the first embodiment of the present invention, two pieces of CI, 'Cell #1 and Cell #2', and two pieces of PTMAPI for two PTMAPs are created respectively, and a single piece of PGI, 'PGI #1', is created, as shown in FIG. 3. Consequently, plural pieces of CI, namely, two pieces of CI, are associated with single piece of PGI in this embodiment, which means that single piece of CI includes information related to only one substream of a single digital channel.

The PGI and the CI are written in the PGCI while the PTMAP and the PTMAPI are in the HOBI.

In general, navigation data such as PGCI and HOBI are loaded into a memory (not shown) from the HD-DVD 100 during recording mode, and the pieces of PGI, CI and HOBI, created as described above are inserted in the navigation data which will be stored in a navigation data area of the HD-DVD 100 after the substreams of plural digital channels are completely recorded.

FIGS. 4 to 7 are illustrative structures of navigation data created when a multi-channel stream is recorded as shown in FIG. 3.

The PGCI of FIG. 4 includes program chain general information 'PGC_GI', plural pieces of PGI 'PGI #1 to #n', a plurality of CI search pointers 'CI_SRP #1 to #m', and plural pieces of CI 'CI #1 to #m'. Each piece of PGI includes fields of program type 'PG_TY' and the number of CI 'C_Ns'.

The program type 'PG_TY', 8-bit long, is composed of 'Protect' flag, 'S/M' flag, 3-bit number of channels 'Channel_Ns' and 'Reserved' as shown in FIG. 5. The 'Protect' flag indicates whether an associated program (PG), equivalent to a conceptually-unitized stream, is erasable or not. The 'S/M' indicates whether an associated PG includes a single-channel or a multi-channel stream, and the number of channels 'Channel_Ns' describes the number of digital channels included in a recorded stream of an associated PG.

For example, for the HOB #1 of FIG. 3 in which two substreams of two digital channels are recorded, '010' (=2) is written in the field 'Channel_Ns' allocated in the program type 'PG TY' of the first piece of PGI 'PGI #1' and the 'S/M' flag allocated in the program type 'PG_TY' is set to represent multi-channel stream. Furthermore, because a piece of CI is created for each digital channel, '2' is written in the field 'C_Ns' of the first piece of PGI 'PGI #1' for the recording example of FIG. 3.

Each piece of CI is, as shown in FIG. 4, composed of five fields of cell type 'C_TY', HOBI search pointer number 'HOBI_SRPN', PTMAP number 'PTMAPN', start PTM of a cell 'C_V_S_PTM', and end PTM of a cell 'C_V_E_PTM'.

The field 'C_TY', 8-bit long, is composed of sub-fields of 2-bit cell type 'C_TY1', 3-bit channel number of a cell 'C_CH_N', and reserved as shown in FIG. 6 where the sub-field 'C_TY1' indicates whether a cell is related with multi-channel or single-channel stream, and the sub-field 'C_CH_N' describes digital channel number of a recorded substream referred by a cell.

For example, digital channel numbers of the first and the second substream are respectively written in those sub-fields 'C_CH_N' of the two pieces of CI 'CIs #1 and #2' referring to the HOB #1 of FIG. 3 in which two substreams of two digital channels are included.

Figure 7:
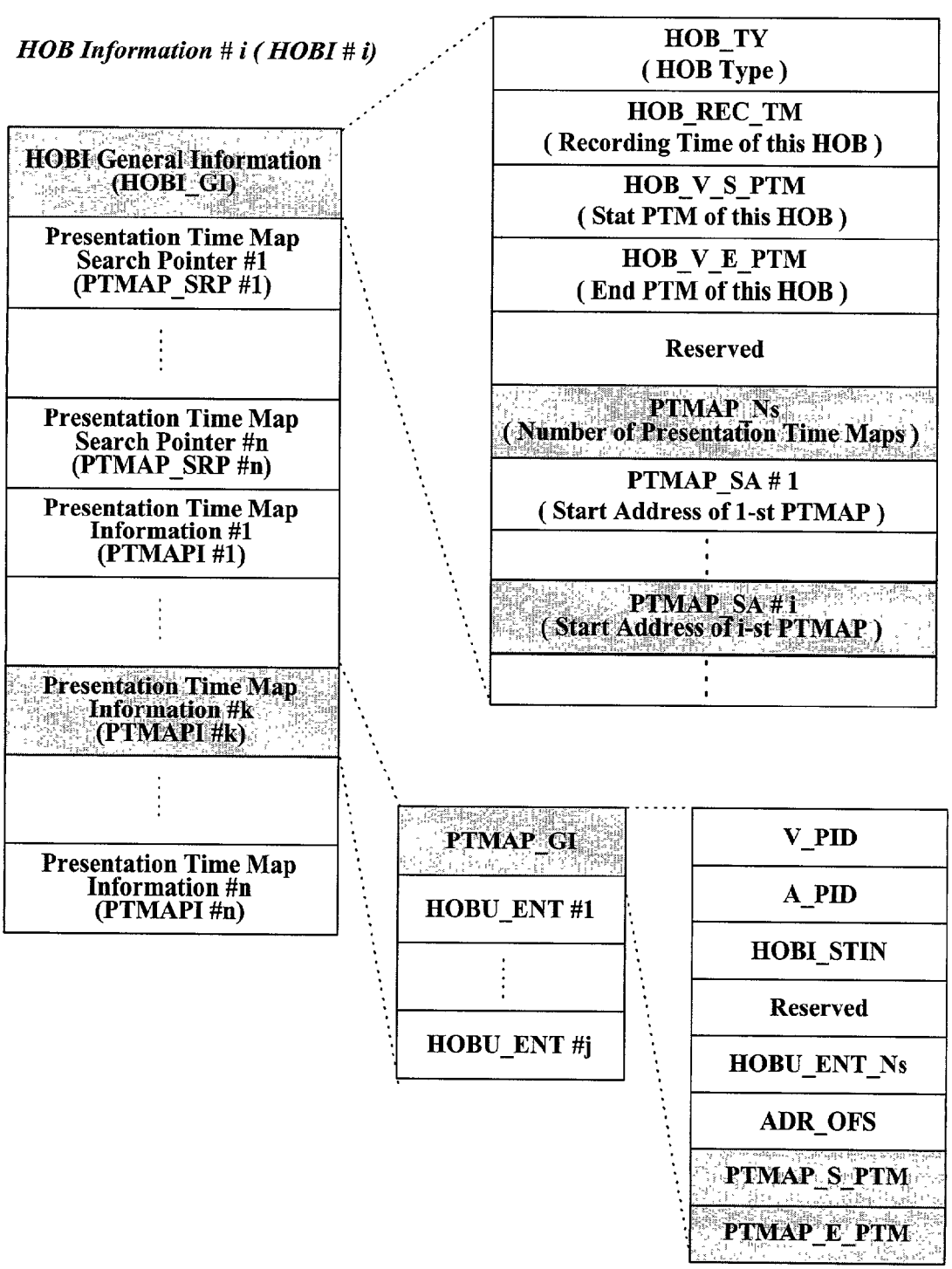

The HOBI, linked with the CI through the field 'HOBI_SRPN' included in each piece of CI, comprises HOBI general information 'HOBI_GI', a plurality of PTMAP search pointers 'PTMAP_SRP #1 to #n', and plural pieces of PTMAP information 'PTMAPI #1 to #n', as shown in FIG. 7.

The HOBI general information 'HOBI_GI' consists of many fields of HOB type 'HOB_TY', HOB recording time 'HOB_REC_TM', start PTM of a HOB, end PTM of a HOB, the number of PTMAPs 'PTMAP_Ns', and start addresses of all PTMAPs 'PTMAP_SA #i'.

The PTMAPI includes PTMAP general information 'PTMAP_GI' and entries of random accessible HOB units 'HOBU_ENT #1 to #j'. The PTMAP general information 'PTMAP_GI' is composed of fields of video 'V_PID' and audio packet ID 'A_PID', indicative of respective PIDs of audio and video TPs constituting a recorded stream associated with a PTMAP, HOBI index number 'HOBI_STIN', the number of random accessible HOB units 'HOBU_ENT_Ns', start PTM of a PTMAP 'PTMAP_S_PTM', and end PTM of a PTMAP 'PTMAP_E_PTM'.

The navigation data structured shown in FIGS. 4 to 7 is created and recorded for a recorded multi-channel stream. As a result, when a HOB is selected for reproduction, it can be known that the chosen HOB contains substreams of a plurality of digital channels based on the program type 'PG_TY' and the number of CI 'C_Ns' in a piece of PGI, included in the PGCI, associated with the chosen HOB.

Each digital channel number can be known from a piece of CI of which index number is equal to that of the PGI.

When searching a substream of a chosen digital channel contained in a recorded multi-channel stream in a HOB, a PTMAP associated with a substream of the chosen digital channel is determined first based on the information written in the number of PTMAPs 'PTMAP_Ns', each PTMAP start address 'PTMAP_SA #i', and start and end PTM of a PTMAP 'PTMAP_S_PTM' and 'PTMAP_E_PTM' of the PTMAP general information 'PTMAP_GI' of each piece of PTMAP information 'PTMAPI #i'. Next, a substream of the chosen digital channel is searched and then reproduced selectively among a recorded multi-channel stream using PTM incremental time and size of each data unit written in the determined PTMAP.

Figure 8:
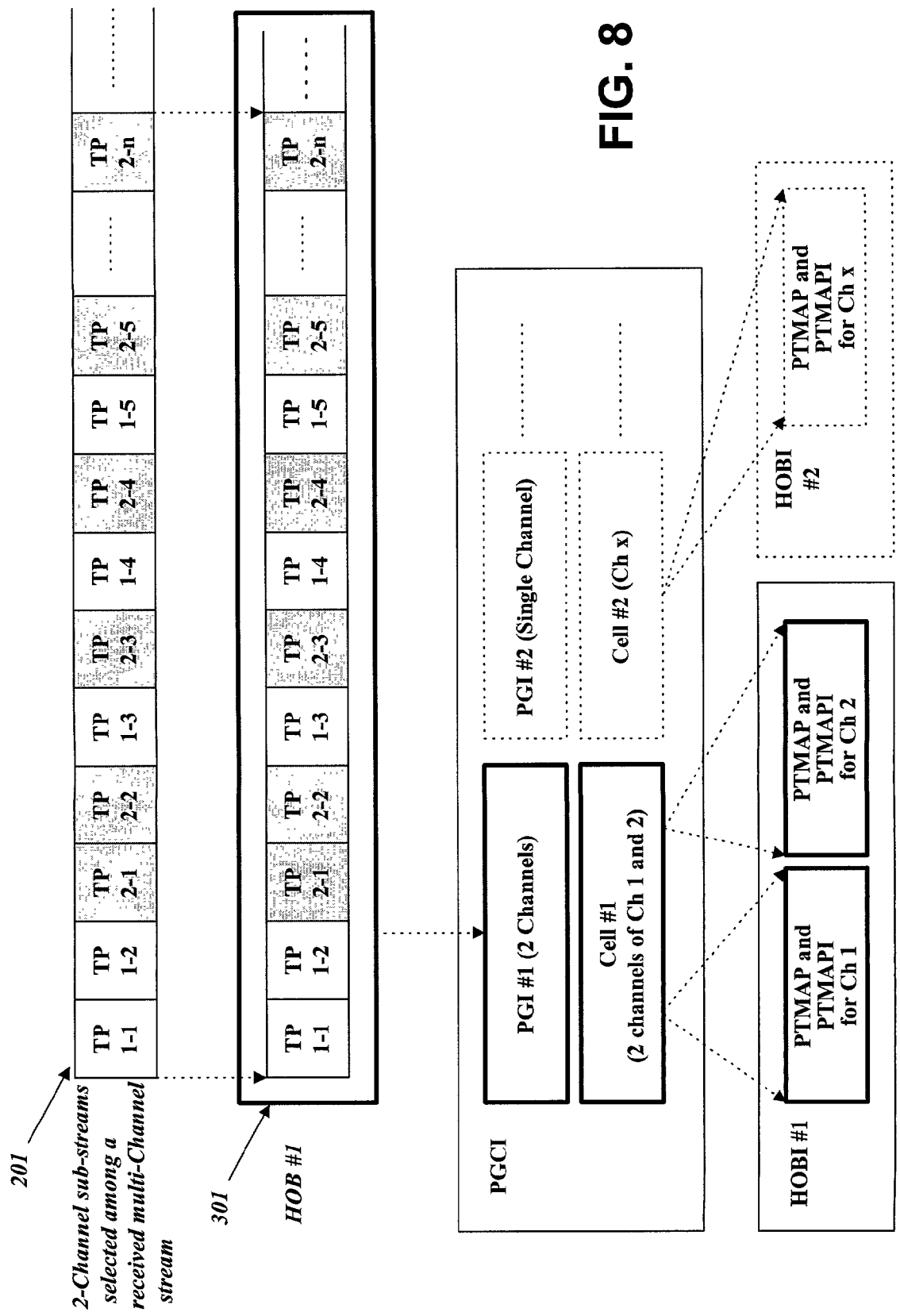
FIG. 8 illustrates the second embodiment of creating navigation data for substreams of a plurality of digital channels recorded in a single HOB in accordance with the present invention.

FIG. 8 illustrates the second embodiment of creating navigation data for substreams of a plurality of digital channels recorded in a single HOB in accordance with the present invention.

This second embodiment of FIG. 8 is different from the first of FIG. 3 in that a single piece of CI is created. However, the PTMAPI used for substream-distinguishable searching is created the same as the first embodiment, namely, as many pieces of PTMAPI as the number of digital channels contained in a multi-channel stream are created.

Since this second embodiment is different from the first in the number of pieces of CI created after recording substreams of a plurality of digital channels, the structure of the CI is changed from FIG. 4.

A piece of CI of this second embodiment includes a 'field of the number of channels' besides the fields of FIG. 4, and the field group composed of the PTMAP number 'PTMAPN', start PTM of a cell 'C_V_S_PTM', and end PTM of a cell 'C_V_E_PTM' is created as many as the number of digital channels contained in a recorded stream referred by the piece of CI. In addition, an additional field for writing digital channel numbers is reserved in the piece of CI since a single piece of CI covers all of digital channels contained in a recorded multi-channel stream.

Since the CI has information on the number of channels of a recorded stream, the PGI need not have that information. Accordingly, in this second embodiment, the 3-bit sub-field 'Channel_Ns' of FIG. 5 allocated in the program type 'PG_TY' is removed from the PGI.

In addition, because a single piece of CI is created even though a stream of a plurality of digital channels is recorded, the field 'C_Ns' indicative of the number of pieces of CI is removed from the PGI of FIG. 4.

Even in this second embodiment, all information on every recorded substream of every digital channel is included in navigation data as in the first embodiment. Therefore, a substream of a selected digital channel may be searched and reproduced from among mixed multiple substreams.

Figure 9:
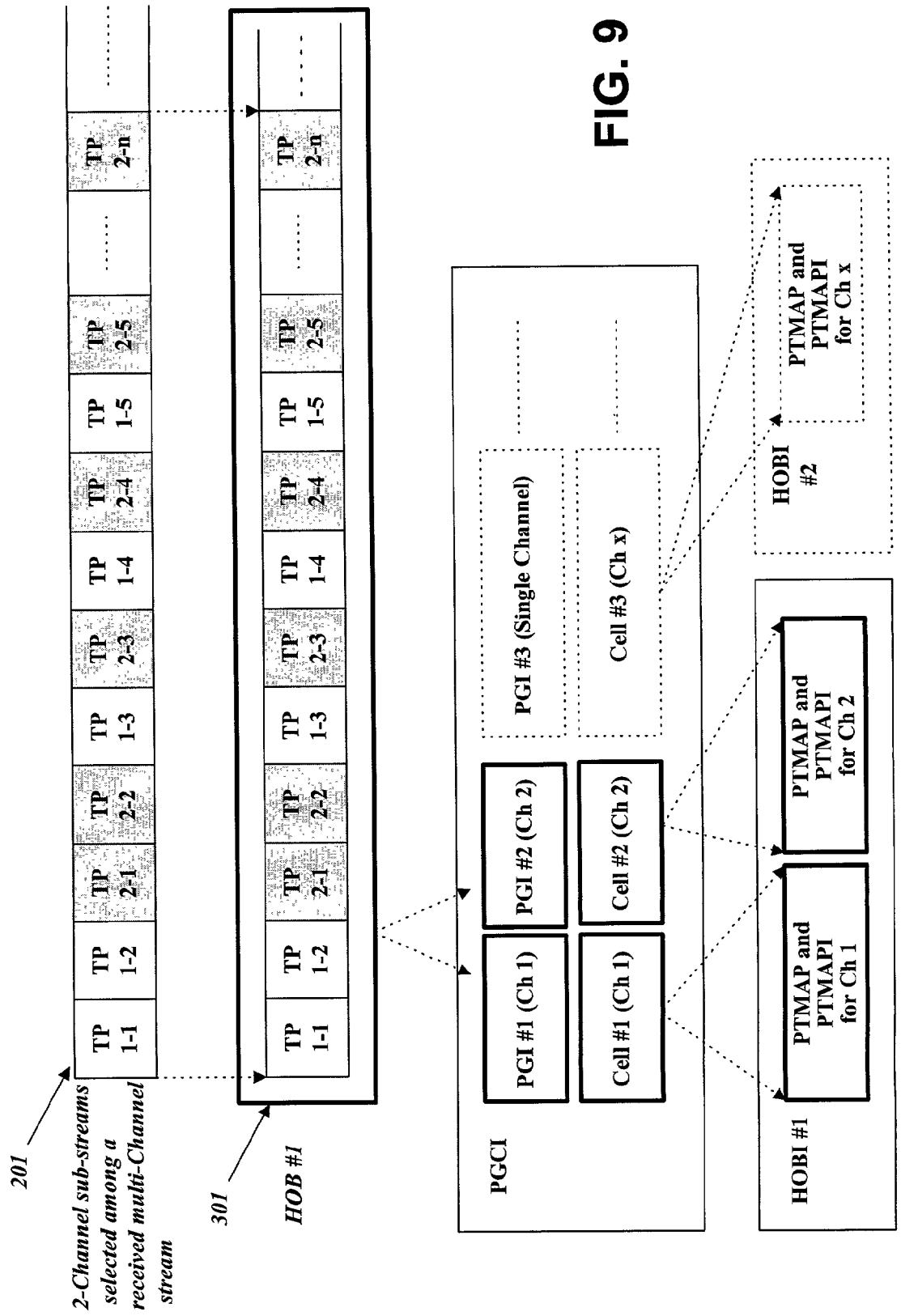
FIG. 9 illustrates the third embodiment of creating navigation data for substreams of a plurality of digital channels recorded in a single HOB in accordance with the present invention.

FIG. 9 illustrates the third embodiment of creating navigation data for substreams of a plurality of digital channels recorded in a single HOB in accordance with the present invention.

This third embodiment of FIG. 9 creates and records as many pieces of PGI as the number of digital channels, besides CI and PTMAPI.

Therefore, in this third embodiment, a piece of PGI covers only single substream contained in a multi-channel stream. In this case, since a piece of PGI shall accompany at least one piece of CI, a piece of CI need not reserve a field for information about a plurality of digital channels. Therefore, the sub-fields of FIG. 6, namely the cell type 'C_TY1' allocated for identifying 'multi' or 'single' stream and the channel number 'C_CH_N' need not be assigned in a piece of CI. Furthermore, the PTMAP number field 'PTMAPN' is removed from CI fields.

In addition, since a piece of PGI is created for each substream, a piece of PGI need not manage plural channels, so that the sub-field 'Channel_Ns' allocated in the program type 'PG_TY' of FIG. 5 is not necessary. Instead, a new field for writing channel number of an associated substream shall be allocated in the PGI.

Figure 10:
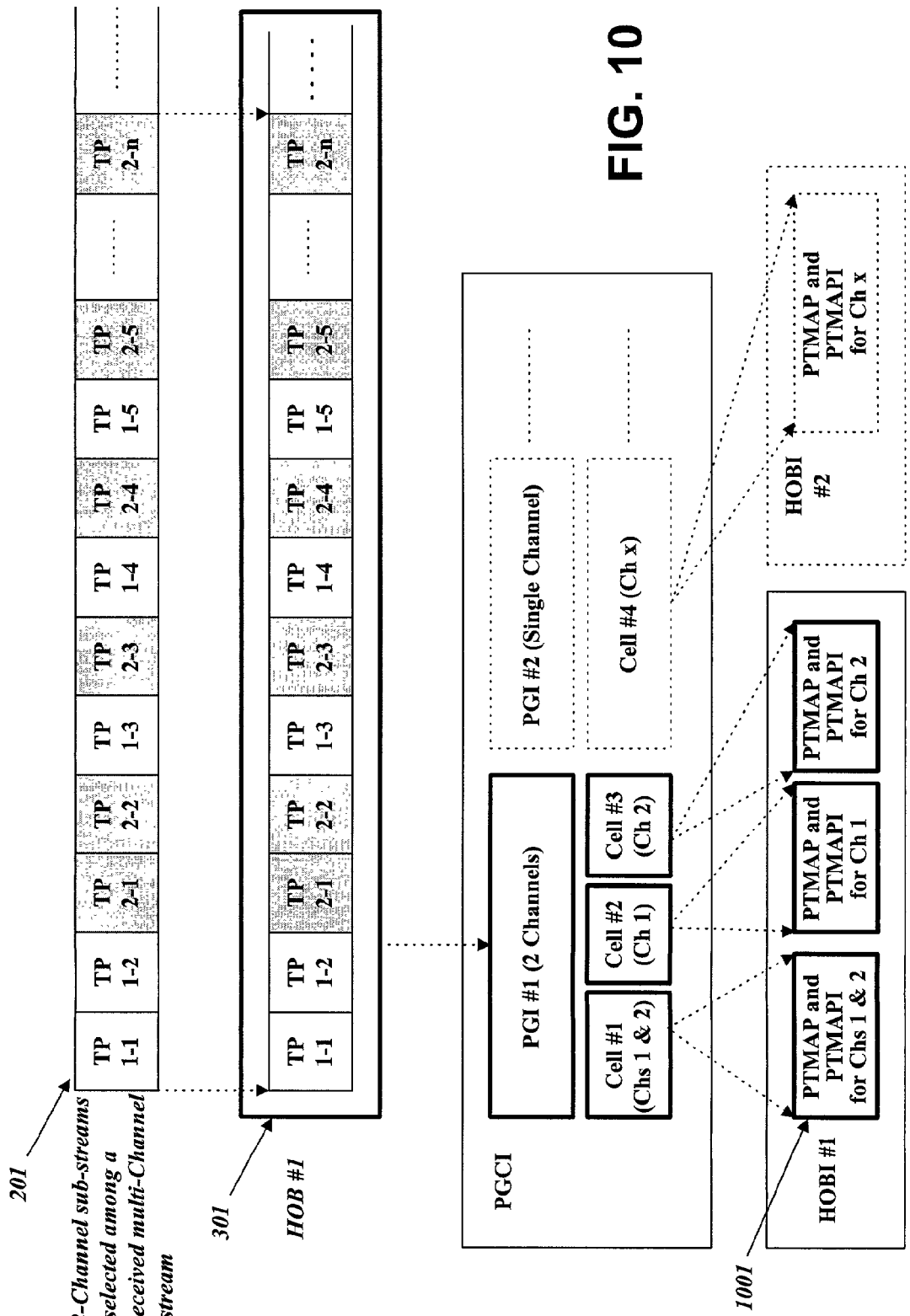
FIG. 10 illustrates the fourth embodiment of creating navigation data for substreams of a plurality of digital channels recorded in a single HOB in accordance with the present invention.

FIG. 10 illustrates the fourth embodiment of creating navigation data for substreams of a plurality of digital channels recorded in a single HOB in accordance with the present invention.

This fourth embodiment of FIG. 10 is different from the first of FIG. 3 in that PTMAPI 1001 for a multi-channel stream is further created besides respective PTMAPI for each substream.

Since there are two types of PTMAPI for a single sub stream and entire sub streams multiplexed in a multi-channel stream it is necessary to distinguish types. Thus, an additional PTMAP type field for distinguishing types, namely, 'single' and 'mixed' shall be allocated in the PTMAP general information 'PTMAP_GI' in FIG. 7. The same as PTMAPI, the CI shall be distinguished by the type of a referenced stream, namely, 'single' for a single substream and 'mixed' for entire substreams, so that an additional field for writing 'single' or 'mixed' is needed in the CI. However, instead of allocating the additional field, the cell type 'C_TY1' of FIG. 6 may be used for this type discrimination by respective new codes assigned to 'single' and 'mixed'.

The PTMAP for a multi-channel stream may not be created in stream recording. Instead, it is constructed from PTMAPs of respective substreams when it is necessary.

In this fourth embodiment of FIG. 10, three pieces of CI are created even though two substreams are recorded. As a result, for the illustrative multi-channel stream record of FIG. 10, '3' (=the number of channels +1) is written in the field 'C_Ns' of a piece of PGI and the number (=2) of actual channels is written in the sub-field 'Channel_Ns' in the program type 'PG_TY'.

In addition, special code, e.g., zero (=0), which is not used as an actual channel number, is written in the channel number sub-field 'C_CH_N' of the CI referring to a multi-channel stream. The object of using such a special code is to identify easily which navigation data is associated with an entire multi-stream in case that a channel number can not be assigned when a multi-channel stream is to be searched or reproduced not selectively but overall as it is recorded.

Figure 11:
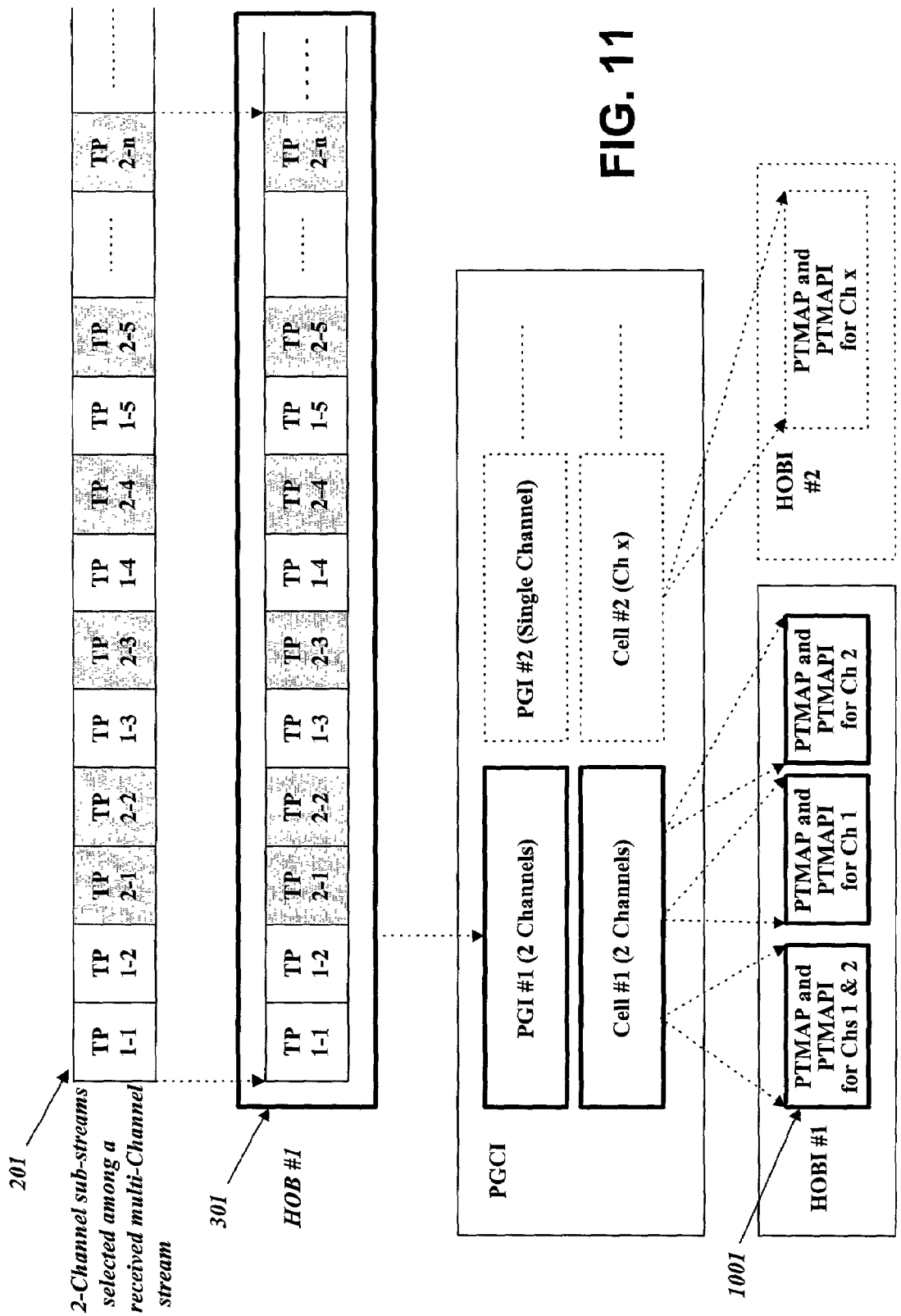
FIG. 11 illustrates the fifth embodiment of creating navigation data for substreams of a plurality of digital channels recorded in a single HOB in accordance with the present invention.

FIG. 11 illustrates the fifth embodiment of creating navigation data for substreams of a plurality of digital channels recorded in a single HOB in accordance with the present invention.

This fifth embodiment of FIG. 11 is different from the second of FIG. 8 in that PTMAPI 1001 for a multi-channel stream is further created besides respective PTMAPI for each substream.

The same as the fourth embodiment, this fifth embodiment includes an additional PTMAP type field for 'single' and 'mixed' in the PTMAP general information 'PTMAP_GI' in FIG. 7.

The PTMAP for a multi-channel stream may not be created in stream recording. Instead, it is constructed from PTMAPs of respective substreams when it is necessary.

This fifth embodiment of FIG. 11, similar to the second embodiment, has an additional field for writing the number of virtual channels, in which 'the number of actual digital channels' +1 is written, in the CI besides the fields of FIG. 4. And it has also as many field groups as the number of digital channels plus 1 in the CI. A field group is composed of the PTMAP number 'PTMAPN', start PTM of a cell 'C_V_S_PTM', and end PTM of a cell 'C_V_E_PTM'.

In addition, a new field for writing 'single' or 'mixed' is created for each field group in the CI to indicate whether a field group is related with a single or a multi-channel stream. And, another new field for writing channel number of a related substream or multi-channel stream is also allocated for each field group because a single piece of CI manages a plurality of substreams.

A special code, e.g., zero (=0) is written in the new channel number field of a field group assigned to a multi-channel stream to achieve the same object with the fourth embodiment.

Figure 12:
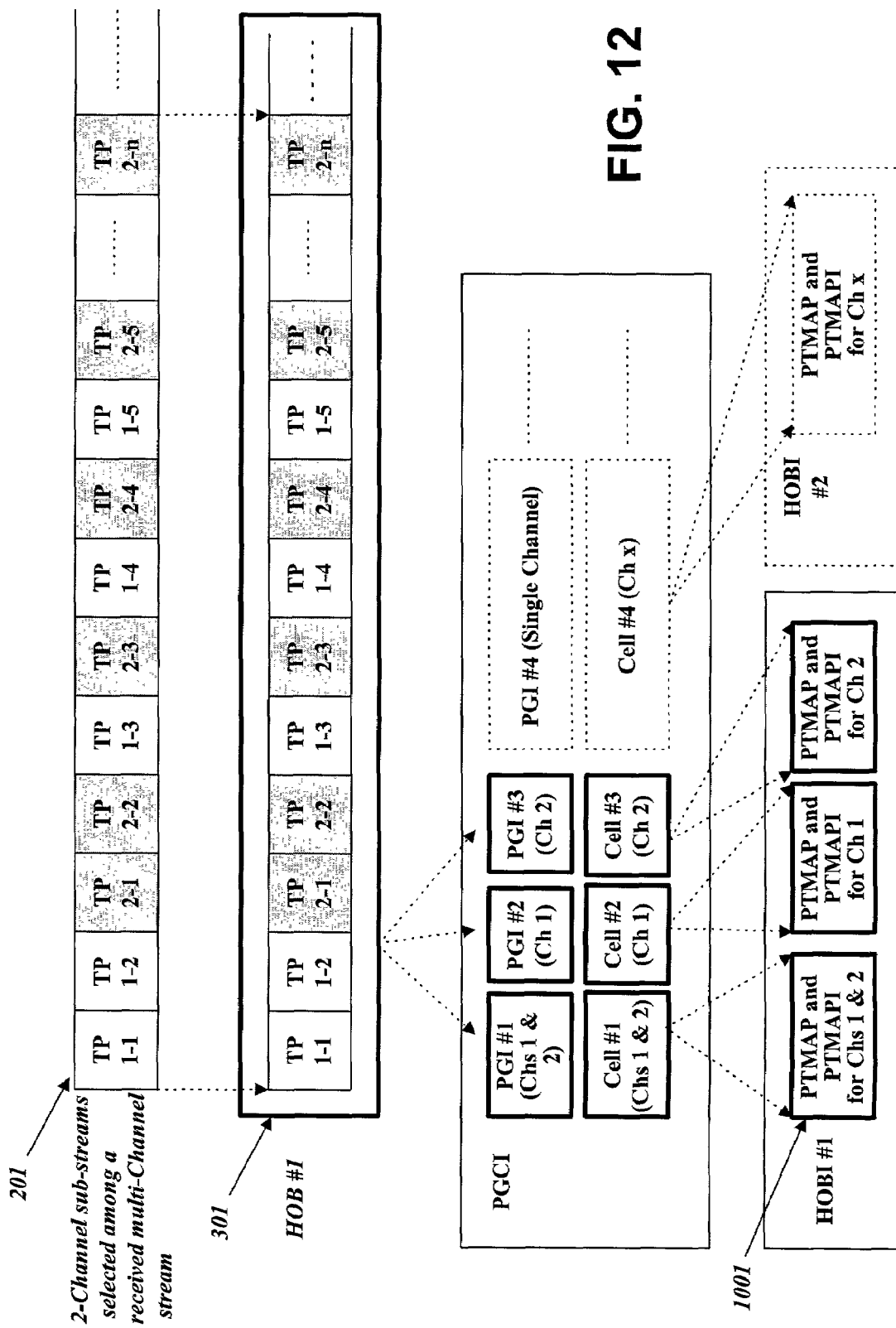
FIG. 12 illustrates the sixth embodiment of creating navigation data for substreams of a plurality of digital channels recorded in a single HOB in accordance with the present invention.

FIG. 12 illustrates the sixth embodiment of creating navigation data for substreams of a plurality of digital channels recorded in a single HOB in accordance with the present invention.

This sixth embodiment of FIG. 12 is different from the third of FIG. 9 in that PTMAPI 1001 for a multi-channel stream is further created besides respective PTMAPI for each substream.

The same as the fourth embodiment, this sixth embodiment includes an additional PTMAP type field for 'single', and 'mixed' in the PTMAP general information 'PTMAP_GI' in FIG. 7. The same as PTMAPI, the CI shall be distinguished by the type of a referred stream, namely, 'single' for a single substream and 'mixed' for entire substreams, so that an additional field for writing 'single' or 'mixed' is needed in the CI. However, instead of allocating the additional field, the cell type 'C_TY1' of FIG. 6 may be used for this type discrimination by respective new codes assigned to 'single' and 'mixed'.

Since a piece of PGI is created even for a multi-channel stream in this sixth embodiment, a piece of PGI must have an additional field for PGI type, namely, 'single' or 'mixed' or have respective codes for 'single' or 'mixed'.

The PTMAP for a multi-channel stream may not be created in stream recording. Instead, it is constructed from PTMAPs of respective substreams when it is necessary.

This sixth embodiment creates a piece of PGI for each substream the same as the third embodiment, so that the CI need not have information for a plurality of channels. Consequently, the channel number 'C_CH_N' is not necessary, and the PTMAP number 'PTMAPN' is not necessarily assigned in the CI, either.

Furthermore, since there is no need that a piece of PGI manages a plurality of channels, the sub-field 'Channel_Ns' in the program type 'PG_TY' of FIG. 5 is not necessary. Instead, an additional field for writing channel number of a related stream shall be allocated in the PGI.

A special code, e.g., '0' is written in this channel number field allocated newly in the PGI associated with a multi-channel stream.

The above-explained multi-channel stream recording method and apparatus make it possible to selectively search and reproduce each substream among a multi-channel stream recorded on a recording medium, thereby improving use convenience of a recording machine such as a digital video recorder.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A computer-readable medium storing a data structure for managing reproduction of at least video data having multiple reproduction paths, comprising:
 a data area storing a transport stream of the at least video data, the transport stream divided into transport packets, each of the transport packets associated with one of the multiple reproduction paths, and the transport packets of the multiple reproduction paths interleaved with each other; and
 a navigation area storing navigation information for managing reproduction of the multiple reproduction paths recorded on the computer-readable medium, the navigation information including a first navigation unit and a separate map associated with each of the multiple reproduction paths, each of the separate maps providing position data for the video data associated with the corresponding reproduction path, wherein the first navigation unit includes one or more second navigation units and controls a reproduction order of the second navigation units, one of the second navigation units includes information for indicating a number of reproduction paths.

2. The computer-readable medium of claim 1, wherein the first navigation area further stores a single piece of program information and a single piece of cell information.

3. The computer-readable recording medium of claim 2, wherein the single piece of cell information includes a field indicating the number of multiple reproduction paths.

4. A method of recording at least video data having a multiple reproduction paths on a recording medium, the method comprising:

recording by a controller a transport stream of at least video data, the transport stream divided into transport packets, each of the transport packets associated with one of the multiple reproduction paths and the transport packets of the multiple reproduction paths interleaved with each other; and recording by a controller a first navigation unit and a separate map associated with each of the multiple reproduction paths, each of the separate maps providing position data for the video data associated with the corresponding reproduction path, wherein the first navigation unit includes second navigation units and controls a reproduction order of the one or more second navigation units, one of the second navigation units includes information for indicating a number of reproduction paths.

5. The method of claim 4, wherein the recording the first navigation unit and the separate map further includes creating a single piece of program information and a single piece of cell information and recording the single piece of program information and the single piece of cell information on the recording medium.

6. The method of claim 5, wherein the single piece of cell information includes a field indicating the number of multiple reproduction paths.

7. A method of reproducing at least video data having multiple reproduction paths on a recording medium, the method comprising;

reading by a controller navigation information including a first navigation unit and separate maps, each of the separate maps associated with one of the multiple reproduction paths and providing position data for the video data associated with the corresponding reproduction path, and the first navigation unit including one or more second navigation units and controlling a reproduction order of the second navigation units, one of the second navigation units including information for indicating number of reproduction paths;

reading by a controller data including a transport stream of the at least video data, the transport stream divided into transport packets, each of the transport packets associated with one of the multiple reproduction paths and the transport packets of the multiple reproduction paths interleaved with another; and reproducing the data based on the navigation information.

8. The method of claim 7, wherein the navigation information further includes information to indicate whether each of the transport packets is associated with multiple reproduction paths.

9. An apparatus for recording at least video data having multiple reproduction paths on a recording medium, the apparatus comprising;

an optical pickup configured to record data including a transport stream of the at least video data, the transport stream divided into transport packets, each of the transport packets associated with one of the multiple reproduction paths and the transport packets of the multiple reproduction paths interleaved with each other; and a controller operably coupled to the optical pickup, the controller configured to control the optical pickup to record a first navigation unit and separate maps, each of the separate maps associated with one of the multiple reproduction paths and providing position data for the video data associated with the corresponding reproduction path, wherein the first navigation unit includes one or more second navigation units and controls a reproduction order of the second navigation units, one of the second navigation units includes information for indicating a number of reproduction paths.

10. The apparatus of claim 9, wherein the optical pickup is configured to record a single piece of program information and a single piece of cell information on the recording medium.

11. The apparatus of claim 10, wherein the single piece of cell information includes a field indicating the number of multiple reproduction paths.

12. The apparatus of claim 9, further comprising:

a receiving unit configured to receive the transport stream of the at least video data; and a stream selector selecting a plurality of substreams from the transport stream of the at least video data received by the receiving unit, the plurality of substreams corresponding to chosen digital channels.

13. An apparatus for reproducing at least video data having multiple reproduction paths on a recording medium, the apparatus comprising:

an optical pickup configured to read data including a transport stream of the at least video data, the transport stream divided into transport packets, each of the transport packets associated with one of the multiple reproduction paths and interleaved with each other; and a controller operably coupled to the optical pickup, the controller configured to control the optical pickup to read navigation information including a first navigation unit and separate maps, the first navigation unit including one or more second navigation units and controlling a reproduction order of the second navigation units, one of the second navigation units including information for indicating a number of reproduction paths, and reproducing the data based on the navigation information, wherein each of the separate maps is associated with one of the multiple reproduction paths and provides position data for the video data associated with the corresponding reproduction path.

14. The apparatus of claim 13, wherein the optical pickup is further configured to read a single piece of program information and a single piece of cell information on the recording medium.

15. The apparatus of claim 14, wherein the single piece of cell information includes a field indicating the number of multiple reproduction paths.

16. The computer-readable medium of claim 1, wherein one of second navigation units further includes information for indicating multiple reproduction paths.

17. The method of claim 4, wherein one of second navigation units further includes information for indicating multiple reproduction paths.

18. The method of claim 7, wherein one of second navigation units further includes information for indicating multiple reproduction paths.

19. The apparatus of claim 9, wherein one of second navigation units further includes information for indicating multiple reproduction paths.

20. The apparatus of claim 13, wherein one of second navigation units further includes information for indicating multiple reproduction paths.

* * * * *